United States Patent
Dorf et al.

[15] 3,656,359
[45] Apr. 18, 1972

[54] ASYMMETRIC BELT CONSTRUCTION

[72] Inventors: Marvin L. Dorf; Leo C. Barnell, both of Lincoln, Nebr.

[73] Assignee: The Goodyear Tire & Rubber Company, Akron, Ohio

[22] Filed: Dec. 21, 1970

[21] Appl. No.: 99,950

[52] U.S. Cl. ............................74/234, 74/230.17 A, 74/237
[51] Int. Cl. ......................F16g 5/00, F16g 1/22, F16h 55/22
[58] Field of Search ...........74/234, 237, 230.17 C, 230.17 A

[56] References Cited

UNITED STATES PATENTS 3,365,967  11/1971  Moogk..........................74/230.17 A

*Primary Examiner*—Leonard H. Gerin
*Attorney*—F. W. Brunner and Ronald P. Yaist

[57] ABSTRACT

A flexible, resilient belt of asymmetrical cross-section including opposite side wall portions, one of which is inclined at a larger angle than the other and a stress zone having an unequal stress-resisting capacity across the width of the belt with the greater stress-resisting capacity being concentrated in the area of the stress zone adjacent to the side wall portion having the larger angle. The belt is particularly useful in variable speed V-belt drives.

18 Claims, 4 Drawing Figures

PATENTED APR 18 1972 3,656,359

INVENTORS
MARVIN L. DORF
LEO C. BARNELL
BY Ronald P. Yoist
ATTORNEY 3,656,359

ASYMMETRIC BELT CONSTRUCTION

BACKGROUND OF THE INVENTION

This invention relates to transmission belts and more particularly, to transmission belts of the V type having an asymmetrical cross-section which are particularly useful on variable speed V-belt drives. This invention has specific application to a novel belt structure for an asymmetric V-belt to improve its operability in such drives.

V-belts of asymmetrical cross-section are known in the art. These belts usually have the customary trapezoidal cross-sectional configuration but have one vertical or substantially vertical side wall and an opposite side wall inclined at an oblique angle thereto, as measured with respect to the vertical centerline of the belt section. The asymmetric V-belts are designed to operate with pulleys of similar cross-sectional configuration, for example, in variable speed drives. A belt of this particular cross-sectional configuration offers certain advantages over a conventional V-belt whose side walls are inclined at approximately equal angles in that it is more easily maintained in its running plane during regulation adjustments of the drive. For example, Moogk, U.S. Pat. No. 3,365,967 discloses a stepless, variable V-belt driving gear which includes an asymmetric V-belt having one side wall inclined up to 1° and the opposite side wall inclined by about 19°. The stress of strength zone of this V-belt includes reinforcing cords of the same or similar modulus material uniformly disposed across its entire width so that higher power may be transmitted by the belt.

Some difficulties, however, have been encountered with a V-belt of asymmetrical cross-section having the construction of the type disclosed in this previously mentioned prior art reference. For example, after a period of operation in the belt drive, the asymmetric V-belt becomes distorted in length and tends to bow laterally between the sheaves or pulleys to such an extent that if the belt is removed from the drive and laid on a horizontal surface, the belt then in effect becomes a horizontal section of a cone. The asymmetric V-belt also tends to ride higher in the sheaves or pulleys on the side of the belt having the larger side wall angle. Due to the disadvantages listed above, the efficiency and useful life of this type belt has been appreciably reduced.

These problems are likely attributable to the fact that the belt stretches more on its large angle side than on its small angle side. This believed to be, at least in large measure, due to the unequal stress distribution which is created across the width of the belt during its operation in the drive since the large angle side is under the greater stress. It has been found unexpectedly that the beforementioned disadvantages of the asymmetric V-belt are overcome by the belt structure of the present invention having a stress zone of unequal stress-resisting capacity which will be hereinafter more fully described.

OBJECTS OF THE INVENTION

It is a primary object of the present invention to provide a V-belt of asymmetrical cross-section which will have improved service life and operability.

It is another important object of the present invention to provide a V-belt of asymmetrical cross-section which will operate more uniformly in a belt drive assembly and will not become distorted in length and bow laterally during its operation around and between the pulleys in a belt drive assembly.

It is another object of this invention to provide an asymmetric V-belt structure which will result in a substantially equal stress distribution across the width of the belt during its operation on a variable speed drive.

Other objects and advantages of this invention will become apparent hereinafter as the description thereof proceeds, the novel features, arrangements and combinations being clearly pointed out in the specification as well as the claims thereunto appended.

It has been found, in accordance with the teachings of the present invention, that the beforementioned objects can be accomplished by providing a flexible, resilient belt having a body portion of asymmetrical cross-section which includes a first base or bottom portion; a second base or top portion spaced from the bottom portion; opposite side wall portions joining the base portions, including a first side wall portion defining one longitudinal edge of the belt and a second side wall portion defining the opposite longitudinal edge of the belt and inclined at a greater angle than the first side wall portion, as measured with reference to the vertical centerline of the belt section; and a stress zone disposed between the base portions having unequal stress-resisting capacity across the width of the belt with a greater stress-resisting capacity concentrated in an area of the belt adjacent to the second side wall portion.

In the preferred belt construction, the stress zone includes at least one stress-resisting member extending longitudinally of the belt and disposed transversely thereof in at least the area of the stress zone which is adjacent to the second side wall portion. In this regard it is preferred that each of the stress-resisting members be disposed in helical wraps across the belt in the stress zone with each wrap of the helix positioned in spaced side-by-side relationship to form a plurality or group of spaced elements. The elements preferably terminate at a substantial distance from the first side wall portion so that the area of the stress zone adjacent to the first side wall portion is at least substantially unreinforced.

It is also possible that the stress zone include a second group of elements therein disposed adjacent to the first side wall portion with the elements of the second group being spaced at a greater distance from each other than the elements of the first mentioned group. In addition, the elements may be disposed transversely across substantially the entire width of the belt and include one group of elements adjacent to the first side wall portion composed of a relatively low modulus material and another group of elements adjacent to the second side wall portion composed of a relatively high modulus material.

DESCRIPTION OF THE PREFERRED EMBODIMENTS

Figure 1:
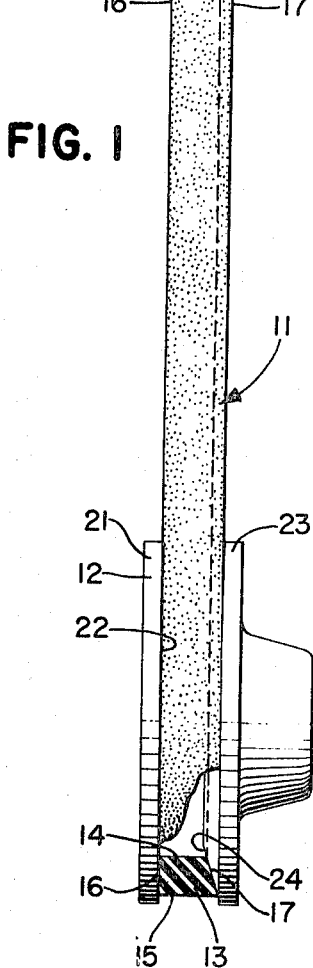
FIG. 1 is a fragmentary view partially in section of a belt drive assembly including the transmission belt of the present invention shown in its operating position around the pulleys of the drive.
Figure 2:
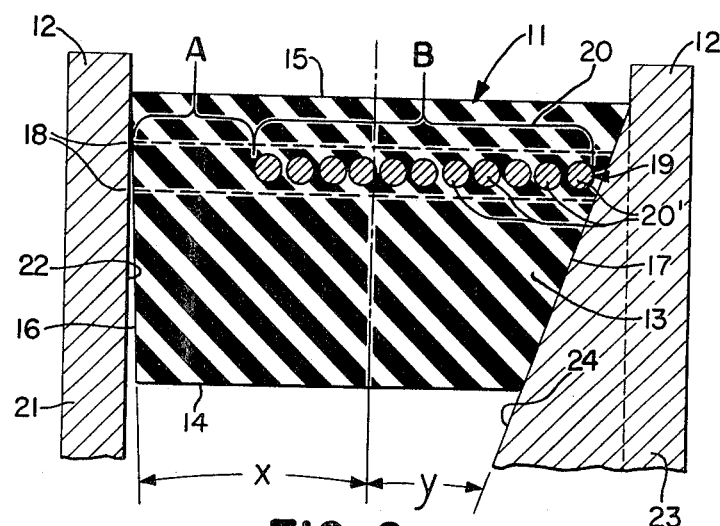
FIG. 2 is an enlarged fragmentary sectional view taken on line 2—2 of FIG. 1.

Referring now to the drawings, in FIGS. 1 and 2 a part of a belt drive assembly 10, for example of the variable speed type, is shown including a flexible transmission belt 11 which is trained around rigid metallic sheaves or pulleys 12.

The specific features of the belt 11 are best seen in FIG. 2. As illustrated, the belt 11 is of a reinforced unitary construction and includes a body portion 13 of flexible, resilient material. This is preferably a flexible, polymeric material such as natural or synthetic rubber or other elastomeric materials.

The body portion 13 has an asymmetrical, generally trapezoidal cross-section which includes a base portion 14 which may be referred to in this instance, as viewed in FIG. 2, as the bottom or minor base of the belt 11, and another base portion 15 spaced from the first mentioned base portion 14 which in this instance, as viewed in FIG. 2, may be referred to as the top or major base of the belt 11. Opposite side wall portions 16 and 17 join the base portions 14 and 15. A first side wall portion 16 defines one longitudinal extending edge of the belt 11 and a second side wall portion 17 defines the opposite longitudinal extending edge of the belt 11 and is inclined at a greater angle than the first side wall portion 16 as measured with reference to the vertical centerline of the belt section. The incline of side wall portion 16 is designated as angle $x$ and the incline of side wall portion 17 is designated as angle y. Preferably, the first side wall portion 16 is substantially parallel to the vertical centerline of the belt section and angle x is from about 0 degrees to about 5 degrees as measured with respect thereto. Similarly, the second side wall portion is inclined at an angle y of from about 13° to about 20° with respect to the vertical centerline of the belt section. For optimum operating conditions, it is recommended that the angle x be from about 1° to about 2° and that the angle y be about 19°.

The body portion 13 further includes a stress or strength zone 18 disposed between the base portions 14 and 15. The stress zone 18 is the load-carrying section of the belt 11 which is subjected to tension stress as the belt 11 is running in its longitudinal extent between the pulleys 12. This same zone or section 18 is commonly referred to as the neutral axis section when the belt is bending around the pulleys since, at that moment, it is neither under tension nor compression. The stress zone 18 has an unequal stress-resisting capacity across the width of the belt 11 with the lesser stress-resisting capacity being concentrated in an area A adjacent to the first or substantially vertical side wall portion 16 and the greater stress-resisting capacity being concentrated in an area B thereof adjacent to the second side wall portion 17 or the side wall portion inclined at the largest angle with respect to the vertical centerline of the belt section.

In the preferred form of the invention, as most clearly shown in FIG. 2, the unequal stress-resisting properties are accomplished by a structure in which the stress zone 18 includes at least one stress-resisting member 19 extending longitudinally of the belt 11 and disposed transversely thereof in at least the area B of the zone adjacent to the second side wall portion 17 of the belt 11. Usually, the member 19 is in the form of a single cord which is disposed in helical wraps across the stress zone 18 in area B with each wrap of the cord positioned in spaced side-by-side relationship to form a plurality or group 20 of spaced elements 20'. The cord may be either of a twisted fiber or filament construction referred to as cable cord or tire cord which is composed of any of the well-known textile fabric materials, such as cotton, nylon, rayon or polyester or combinations thereof and may also be composed of such materials as steel wire or fiber glass. The group 20 of elements 20' terminates at a substantial distance from the first side wall portion 16 so that the area A of the zone 18 is at least substantially unreinforced. It has been found that the unequal stress-resisting capacity thus created in the zone 18 by the foregoing structure results in a more evenly or uniformly distributed stress across the width of the belt 11, thereby preventing the stretch or longitudinal distortion of the large angle side wall 17 of the belt 11 with its resultant lateral bow. In addition, the belt 11 also rides more evenly in the pulleys 12 and its useful life is greatly increased.

It should also be understood that provided it is disposed as described above, the stress-resisting member 19 can also be in other forms such as a square-woven fabric layer of conventional materials and construction.

The belts 11 are manufactured in a customary manner as for example, by assembling and vulcanizing the belt components into a unitary construction by means of conventional equipment well-known for these purposes.

In addition, it is apparent that many other various belt constructions are possible. For instance, the belt may also include a fabric envelope surrounding the body portion and may or may not be of a cogged or arched construction well known in the art.

The pulleys 12 have faces or surfaces which correspond generally to the cross-sectional configuration of the belt 11. For example, each pulley 12 includes a section 21 having a substantially planar belt contacting surface 22 and an opposite section 23 having a conical belt contacting surface 24. The substantially vertical planar side wall portion 16 of the belt 11 contacts the surface 22 of the planar pulley section 21 and the second pulley contacting side wall portion 17 of the belt 11 contacts the surface 24 of the conical pulley section 23 during the operation of the belt 11 in the drive 10. Accordingly, the portion 17 is subjected to the greater stress during the operation of the belt 11 since it is in almost complete contact and engagement with the pulley surface 24 whereas the portion 16 is not actually in severe working contact with pulley surface 22. The structure of this invention results in a more even distribution of stress across the belt and largely eliminates or significantly reduces the undue stretching of only one side wall portion of the belt.

Of course, it is to be understood that the belts of this invention can be used with many other belt drive assemblies and consequently, many various pulley arrangements are possible. For instance, it has been found that these belts are particularly useful as part of variable speed drives for small track vehicles such as snowmobiles.

Figure 3:
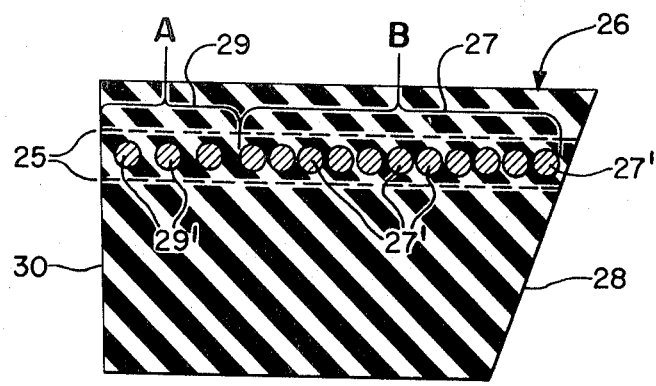
FIG. 3 is a sectional view showing a modification of the invention as shown in FIG. 2.

FIG. 3 shows a modification of the invention in which the stress zone 25 of an asymmetric V-belt 26 includes a first group 27 of elements 27' disposed adjacent to the second or large angle side wall portion 28 of the belt 26 in area B of the zone 25 and a second group 29 of elements 29' are disposed adjacent to the first or small angle side wall portion 30 of the belt 26 in area A of the zone 25. In this embodiment, the elements 29' of the second group 29 are spaced at a greater distance from each other than the elements 27' of the first group 27 so that an unequal stress-resisting capacity is thereby achieved with the greater stress-resisting capacity concentrated in the area B.

Figure 4:
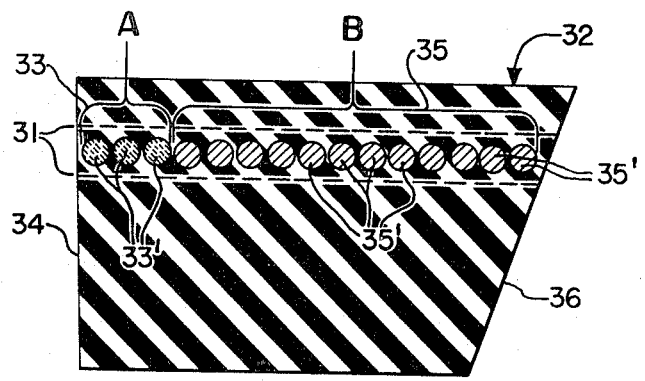
FIG. 4 is a sectional view of still another modification of the invention as shown in FIG. 2.

In FIG. 4, a modification of the invention is shown in which the unequal stress-resisting capacity of the stress zone 31 is achieved by providing reinforcing elements across substantially the entire width of the belt 32. The zone 31 in this instance includes one group 33 of elements 33' adjacent to the first or small side wall angle portion 34 in area A of the zone 31 which is composed of relatively low modulus material. Another group 35 of elements 35' is disposed adjacent to the second or large angle side wall portion in area B of the zone 31 and is composed of relatively high modulus material. For example, the elements 33' of the first group 33 may be cords composed of conventional reinforcing material such as cotton, nylon, rayon and polyester and the elements 35' of the second group 35 may be cords composed of high modulus material such as steel or fiber glass. Alternatively, the elements 33' and 35' may be cords composed of the same material but having differing moduli due to the manner in which the elements or cords of each group 33 and 35 have been processed.

Since the belt structures, as shown in FIGS. 3 and 4, require that the reinforcing elements or cords be disposed in the stress zone in a more exacting manner than the structure disclosed in FIG. 2, they may probably be considered as less desirable from an economic standpoint.

It should be apparent to those skilled in the art that this invention provides a belt structure for an asymmetric V-belt which will accomplish the objects of this invention by correcting the unequal stretching of the belt which has been experienced with previous belt structures of this type in which the reinforcing cord members have been disposed uniformly across the belt's width and have been composed of material of relatively the same modulus.

While certain representative embodiments and details have been shown for the purpose of illustrating the invention, it will be apparent to those skilled in the art that various changes and modifications may be made therein without departing from the spirit or scope of the invention.

What is claimed is:
1. A flexible resilient belt having a body portion of asymmetric cross-section comprising:
   A. a first base portion;
   B. a second base portion spaced therefrom;
   C. opposite side wall portions joining said first and second base portions including:
      1. a first side wall portion defining one longitudinal edge of the belt, and

2. a second side wall portion defining the opposite longitudinal edge of the belt, inclined at a greater angle than said first side wall portion as measured with reference to the vertical centerline of the belt section; and D. a stress zone disposed between said first and second base portions having unequal stress-resisting capacity across the width of the belt with the greater stress-resisting capacity concentrated in an area thereof adjacent to said second side wall portion.

2. The belt as claimed in claim 1 wherein said first side wall portion is substantially parallel to the vertical centerline of the belt section.

3. The belt as claimed in claim 2 wherein with respect to said vertical centerline, said first side wall portion is inclined at an angle of from about 0° to about 5° and said second side wall portion is inclined at an angle of from about 13° to about 20°.

4. The belt as claimed in claim 3 wherein said first side wall portion has an angle of from about 1° to about 2° and said second side wall portion has an angle of about 19°.

5. The belt as claimed in claim 1 wherein said stress zone includes at least one stress-resisting member extending longitudinally of the belt and disposed transversely thereof in at least the area of said stress zone adjacent to said second side wall portion.

6. The belt as claimed in claim 5 wherein said member is disposed in helical wraps across the belt in said stress zone with each wrap thereof positioned in spaced side-by-side relationship to form a plurality of spaced elements.

7. The belt as claimed in claim 6 wherein one group of elements terminates at a substantial distance from said first side wall portion so that the area of said stress zone adjacent thereto is at least substantially unreinforced.

8. The belt as claimed in claim 7 wherein said stress zone further includes a second group of elements therein disposed adjacent to said first side wall portion with the elements of said second group being spaced at a greater distance from each other than the elements of said first mentioned group.

9. The belt as claimed in claim 6 wherein said elements are disposed transversely across substantially the entire width of the belt and include one group of said elements adjacent to said first side wall portion composed of relatively low modulus material and another group of said elements adjacent to said second side wall portion composed of relatively high modulus material.

10. In a drive belt assembly including the combination of a V-belt of flexible, polymeric material having a body portion of asymmetrical cross-section, a pair of pulleys on which the belt is mounted, at least one of which includes a section having a substantially planar belt-contacting surface and an opposite section having a conical belt-contacting surface, said belt comprising first and second spaced base portions and opposite side wall portions joining said base portions including a first substantially vertical planar side wall portion for contacting the planar pulley section and a second pulley-contacting side wall portion opposite said first side wall and disposed at an oblique angle thereto for contacting the conical pulley section, the improvement wherein said belt includes a stress zone disposed between said first and second base portions having unequal stress-resisting capacity across the width of the belt with the greater stress-resisting capacity concentrated in an area thereof adjacent to said second side wall portion.

11. The belt as claimed in claim 10 wherein said first side wall portion is inclined at an angle of from about 0° to about 5° and said second side wall portion is inclined at an angle of from about 13° to about 20°.

12. The belt as claimed in claim 11 wherein said first side wall portion has an angle of from about 1° to about 2° and said second side wall portion has an angle of about 19°.

13. The belt as claimed in claim 10 wherein said stress zone includes at least one stress-resisting member extending longitudinally of the belt and disposed transversely thereof in at least the area of said stress zone adjacent to said second side wall portion.

14. The belt as claimed in claim 13 wherein said member is disposed in helical wraps across the belt in said stress zone with each wrap thereof positioned in spaced side-by-side relationship to form a plurality of spaced elements.

15. The belt as claimed in claim 14 wherein one group of elements terminates at a substantial distance from said first side wall portion so that the area of said stress zone adjacent thereto is at least substantially unreinforced.

16. The belt as claimed in claim 15 wherein said stress zone further includes a second group of elements therein disposed adjacent to said first side wall portion with the elements of said second group being spaced at a greater distance from each other than the elements of said first mentioned group.

17. The belt as claimed in claim 16 wherein said elements are disposed transversely across substantially the entire width of the belt and include one group of said elements adjacent to said first side wall portion composed of relatively low modulus material and another group of said elements adjacent to said second side wall portion composed of relatively high modulus material.

18. The belt as claimed in claim 17 wherein said first group of elements are in the form of textile cords composed of material selected from the group consisting of cotton, nylon, rayon and polyester and said second group of elements are in the form of high strength filaments composed of material selected from the group consisting of steel and fiber glass.

* * * * *